US008869155B2

(12) United States Patent
Almasi et al.

(10) Patent No.: US 8,869,155 B2
(45) Date of Patent: Oct. 21, 2014

(54) INCREASING PARALLEL PROGRAM PERFORMANCE FOR IRREGULAR MEMORY ACCESS PROBLEMS WITH VIRTUAL DATA PARTITIONING AND HIERARCHICAL COLLECTIVES

(75) Inventors: George Almasi, Ardsley, NY (US); Guojing Cong, Yorktown Heights, NY (US); David J. Klepacki, New Paltz, NY (US); Vijay A. Saraswat, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 12/945,488

(22) Filed: Nov. 12, 2010

(65) Prior Publication Data

US 2012/0124585 A1    May 17, 2012

(51) Int. Cl.
*G06F 9/46*    (2006.01)
*G06F 9/52*    (2006.01)

(52) U.S. Cl.
CPC ........................................ *G06F 9/522* (2013.01)
USPC ........................................................ 718/102

(58) Field of Classification Search
CPC .... G06F 9/3851; G06F 9/4843; G06F 9/3004
See application file for complete search history.

(56) References Cited

U.S. PATENT DOCUMENTS 5,860,126 A * 1/1999 Mittal ............................ 711/167
6,292,822 B1 9/2001 Hardwick 2009/0125907 A1 5/2009 Wen et al.
2010/0287357 A1 * 11/2010 Vishkin ......................... 712/207

OTHER PUBLICATIONS

Dehne et al., "Exploring the Limits of GPUs with Parallel Graph Algorithms", Feb. 24, 2010, pp. 1-20. arxiv.org/PS_cache/arxiv/pdf/1002/1002.4482v1.pdf.
Braun et al., "Fault-Tolerance Mechanisms in the SB-PRAM Multiprocessor", Universität des Saarlandes, Computer Science Dept., 66041 Saarbrücken, Germany, retrieved Aug, 30, 2010, pp. 1-4. fernuni-hagen.de/imperia/md/content/fakultaetfuermathematikundinformatik/forschung/berichte/bericht_222.pdf.
Blelloch et al., "Accounting for Memory Bank Contention and Delay in High-Bandwidth Multiprocessors", IEEE Transactions on Parallel and Distributed Systems, IEEE Press Piscataway, NJ, USA, 1997, pp. 1-36.

* cited by examiner

*Primary Examiner* — Abdullah Al Kawsar
*Assistant Examiner* — James J Lee
(74) *Attorney, Agent, or Firm* — Yee & Associates, P.C.; Anne Dougherty

(57) ABSTRACT

A method for increasing performance of an operation on a distributed memory machine is provided. Asynchronous parallel steps in the operation are transformed into synchronous parallel steps. The synchronous parallel steps of the operation are rearranged to generate an altered operation that schedules memory accesses for increasing locality of reference. The altered operation that schedules memory accesses for increasing locality of reference is mapped onto the distributed memory machine. Then, the altered operation is executed on the distributed memory machine to simulate local memory accesses with virtual threads to check cache performance within each node of the distributed memory machine.

15 Claims, 11 Drawing Sheets

RECURSIVE SCHEDULING
PROCESS
500 if $n=1$ then $C[i] \leftarrow D[0], 0 \leq i \leq m-1$;
else $Blk \leftarrow \frac{n}{V}$;
//partition;

502 { Partition $D$ into $V$ blocks, such that $D_k \leftarrow \{D[\frac{kn}{V}],...,D[\frac{(k+1)n}{V}-1]\}, 0 \leq k \leq V-1$;

Partition $R$ into $V$ blocks, such that $R_k \leftarrow \{R[\frac{km}{V}],...,R[\frac{(k+1)m}{V}-1]\}, 0 \leq k \leq V-1$;
//group;

504 { for $0 \leq k \leq V-1$ in parallel do

Sort $R_k$ using $\frac{R_k[j]}{Blk}$ as key, and store the original location of the $j^{th}$ element in $P_k[j], 0 \leq j \leq m/V$;

Partition $R_k$ into $V$ blocks $R_k^j, 0 \leq j \leq V-1$, such that $\forall r \in R_k^j, \frac{r}{Blk} = j$;
end
$R_k^j \leftarrow \sqcup_{j=0}^{V-1} R_j^k, 0 \leq k \leq V-1$;
//access;

506 { for $0 \leq k \leq V-1$ in parallel do

Call Algorithm 1 with $D_k, R_k^j$ and $V$ returning $S_k$
end

Partition $S_k$ into $V$ consecutive blocks $S_k^j, 0 \leq j \leq V-1$, such that $|S_k^j| = |R_k^j|$;
$S_k^j \leftarrow \sqcup_{j=0}^{V-1} S_j^k, 0 \leq k \leq V-1$;
//permute;

508 { for $0 \leq k \leq V-1$ in parallel do

Permute $S_k^j$ into $C_k$ such that $C_k[P_k[j]] = S_k^j[j], 0 \leq j \leq Blk-1$;
end
return $C \leftarrow \sqcup_{k=0}^{V-1} C_k$;
end

FIG. 5

MAPPING PROCESS 700

Input: shared array $D$, private array *indices* with global indices to $D$, size of *indices* is $k$
Output: private output array *outD*
begin 702 { 1. Sort *indices* using the target thread *id* of $D[indices[l]]$ $(0 \leq l \leq k - 1)$ as key 704 { 2. Compute number of elements to request from each thread *needFrom* $[j]$ $(0 \leq j \leq p - 1)$ 706 {
3. Inform all threads of number of elements and their target locations to sent to $thr_j$
$s \leftarrow 0$
for $j \leftarrow 0$ to $p - 1$ do
   3.1 $SMatrix[j][i] \leftarrow needFrom[j]$
   3.2 $PMatrix[j][i] \leftarrow s$
   3.3 $s \leftarrow s + needFrom[j]$
end

708 { 4. All threads enter barrier
UPC_barrier;

710 {
5. Inspect received requests and transfer data elements in batches
for $j \leftarrow 0$ to $p - 1$ do
   5.1 $nSend \leftarrow SMatrix[i][j]$
   5.2 $targetPosition \leftarrow PMatrix[i][j]$
   5.3 Collect data indices requested by thread $thr_j$
   5.4 Gather the data elements
   5.5 Put data to $thr_j$ at position *targetPosition*
end

712 { 6. Permute received data to match the request order
end

FIG. 7

INCREASING PARALLEL PROGRAM PERFORMANCE FOR IRREGULAR MEMORY ACCESS PROBLEMS WITH VIRTUAL DATA PARTITIONING AND HIERARCHICAL COLLECTIVES

This invention was made with Government support under Contract No.: HR0011-07-9-0002 awarded by (DARPA) Defense Advanced Research Projects Agency. The Government has certain rights in this invention.

BACKGROUND

1. Field

The disclosure relates generally to an improved data processing system, and more specifically, to a computer implemented method, system, and computer usable program code for increasing performance of a shared-memory parallel program on a distributed memory machine by increasing network communication performance and cache performance.

2. Description of the Related Art

Shared memory parallel programs of fine-grain parallelism with irregular memory access inputs remain challenging on current architectures. Recent studies have proposed techniques to reduce the gap between computer program and computer architecture for shared-memory platforms. Implementing irregular shared memory parallel programs with high performance is even harder on distributed memory machines where the adverse impact of irregular memory accesses is magnified when memory access requests are served by remote nodes on a distributed memory systems.

As a result, although many fast theoretic programs may exist in the literature, few experimental results are known. The partitioned global address space (PGAS) programming paradigm appears to improve ease of programming for irregular programs. Yet, when the workload is memory intensive and the memory access pattern is irregular, no convincing evidence exists of high performance PGAS implementations.

SUMMARY

According to one embodiment of the present invention, a method for increasing performance of an operation on a distributed memory machine is provided. Asynchronous parallel steps in the operation are transformed into synchronous parallel steps. The synchronous parallel steps of the operation are rearranged to generate an altered operation that schedules memory accesses for increasing locality of reference. The altered operation that schedules memory accesses for increasing locality is mapped onto the distributed memory machine. Then, the altered operation is executed on the distributed memory machine to simulate local memory accesses with virtual threads to check cache performance within each node of the distributed memory machine.

BRIEF DESCRIPTION OF THE SEVERAL VIEWS OF THE DRAWINGS

FIG. 5 is a specific example of recursively scheduling memory accesses for increased locality of reference to increase cache performance in accordance with an illustrative embodiment;

FIG. 7 is a specific example of mapping virtual shared memory accesses onto a distributed memory machine to increase network communication performance in accordance with an illustrative embodiment;

DETAILED DESCRIPTION

Figure 1:
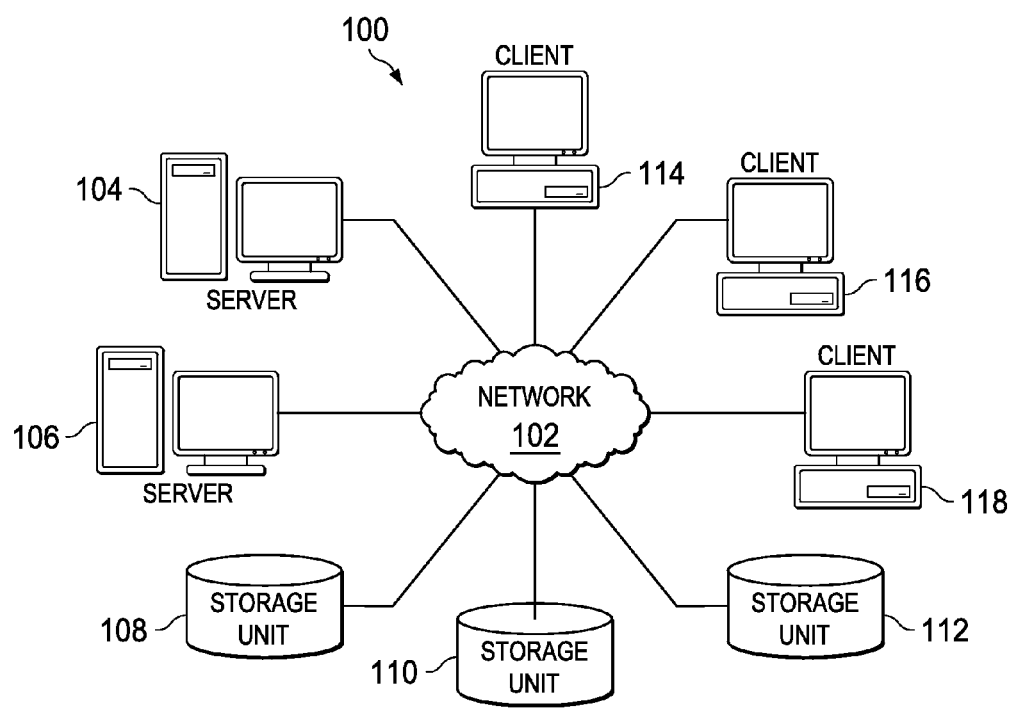
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
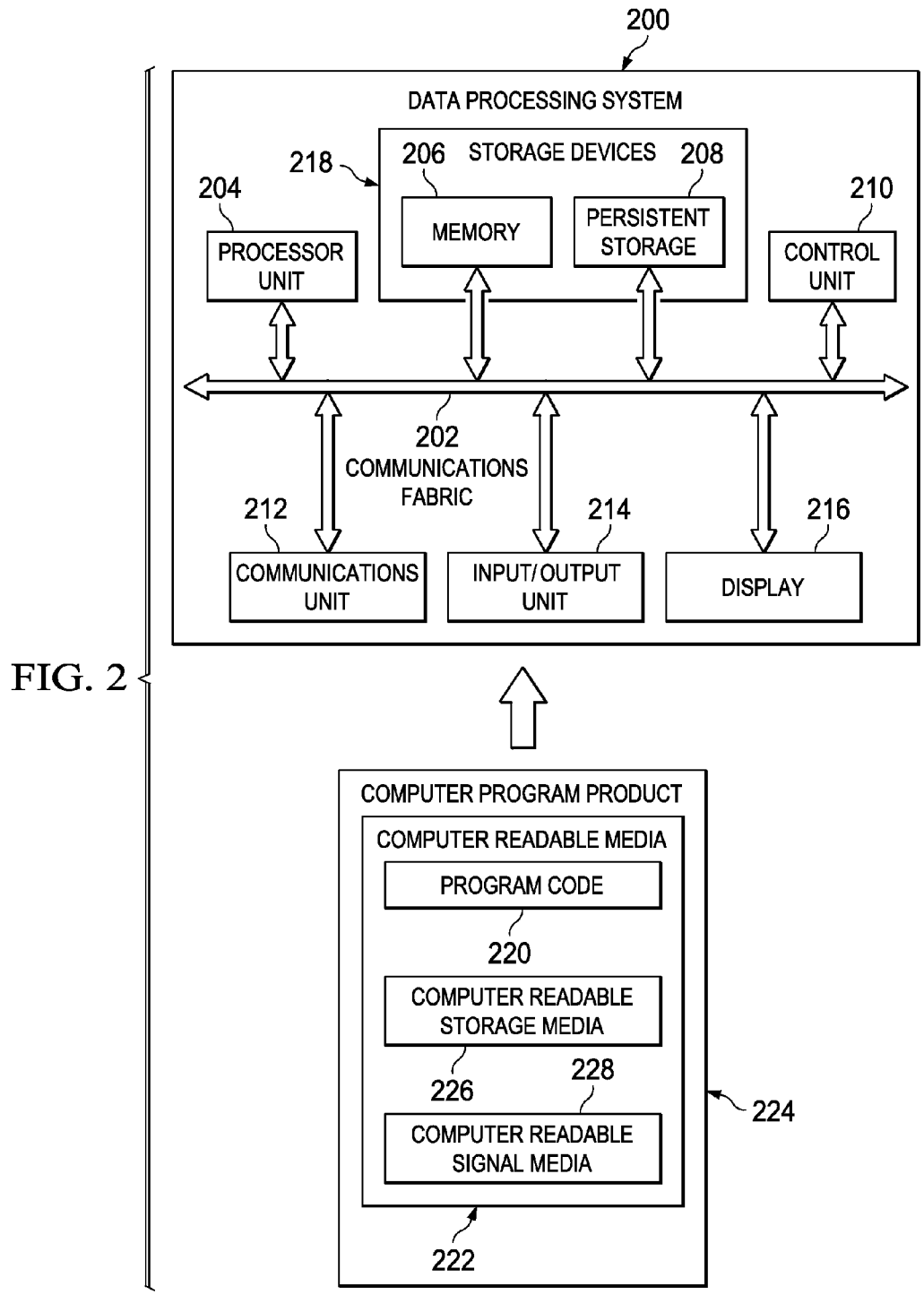
FIG. 2 is a diagram of a data processing system in which illustrative embodiments may be implemented.
Figure 3:
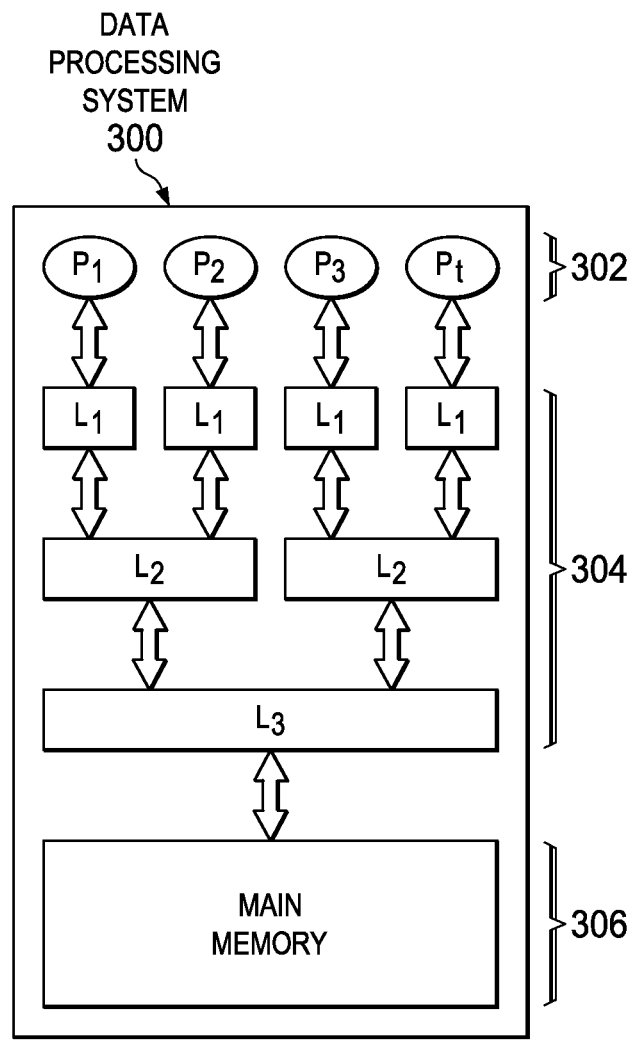
FIG. 3 is a diagram of a data processing system that includes a memory subsystem hierarchy in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. In this example, network data processing system 100 is a distributed memory machine. A distributed-memory machine employs a plurality of processors, each of which has its own local memory and communicates through network 102 for coordination with the other processors. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108, storage unit 110, and storage unit 112. Storage units 108, 110, and 112 are network storage devices capable of storing data in a structured or unstructured format. The data stored in storage units 108, 110, and 112 may be any type of data. Storage units 108, 110, and 112 may be local databases, remote databases, or a combination of remote and local databases. Each of storage units 108, 110, and 112 may, for example, represent a redundant array of independent disks (RAID), a storage area network (SAN), a stand-alone storage server, or any combination thereof.

Clients 114, 116, and 118 also connect to network 102. Client computers 114, 116, and 118 may, for example, be personal computers or network computers. In the depicted example, server computer 104 and/or server computer 106 provide information, such as boot files, operating system images, and applications to client computers 114, 116, and 118. Client computers 114, 116, and 118 are clients to server computer 104 and/or server computer 106. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server 104 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 114 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, control unit 210, communications unit 212, input/output (I/O) unit 214, and display 216.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A storage device is any piece of hardware that is capable of storing information, such as, for example, without limitation, data, program code in functional form, and/or other suitable information either on a transient basis and/or a persistent basis. Memory 206, in these examples, may, for example, be a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Control unit 210 provides control of processes of illustrative embodiments. For example, control unit 210 may control processes for transforming asynchronous parallel steps in an operation into synchronous steps, rearranging the synchronous steps in the operation to generate an altered or modified operation, mapping the altered operation onto a distributed memory machine, and executing the altered operation on the distributed memory machine. Control unit 210 may be a software component, a hardware component, or a combination of software and hardware components. Also, even though control unit 210 is shown within one data processing system in this example, it should be noted that control unit 210 may be distributed throughout a network of data processing systems, such as network data processing system 100 in FIG. 1.

Communications unit 212, in this example, provides for communication with other data processing systems or devices. In this example, communications unit 212 is a network interface card. Communications unit 212 may provide communications through the use of either or both physical and wireless communications links.

Input/output unit 214 allows for the input and output of data with other devices that may be connected to data processing system 200. For example, input/output unit 214 may provide a connection for user input through a keyboard, a mouse, and/or some other suitable input device. Further, input/output unit 214 may send output to a printer. Display 216 provides a mechanism to display information to a user.

Instructions for the operating system, applications, and/or programs may be located in storage devices 218, which are in communication with processor unit 204 through communications fabric 202. An example of a program located in storage devices 218 is a shared-memory parallel program. A shared memory parallel program assumes an abstract interface to memory that is shared among all processors or threads executing in a data processing system, such as network data processing system 100 in FIG. 1. Communication and synchronization are done through access to shared memory locations. The Parallel Random Access Machine (PRAM) model is one example of a machine model for designing parallel shared-memory algorithms and estimating program performance. Shared memory refers to a block of memory that may be accessed by a plurality of different nodes in a distributed memory machine. A partitioned global address space (PGAS) is a logically partitioned global address space where portions of the shared memory space may have an affinity for a particular thread, thereby exploiting locality of reference.

Locality of reference is a type of predictable behavior that occurs in computer systems. Locality of reference refers to related data storage locations being frequently accessed. In other words, reference locality refers to the fact that most instructions in a program are in routines that are executed over and over, and that these routines are in related data storage locations. Spatial locality refers to the reuse of specific data within close data storage locations. Another type of reference of locality is temporal locality, which refers to the reuse of specific data within relatively small time durations. Reference locality is a principle behind memory caches, in which data or instructions are placed in higher-speed memory.

In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a server data processing system may be downloaded over a network from the server to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 222 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a computer implemented method, system, and computer usable program code for increasing performance of a shared-memory parallel program on a distributed memory machine by increasing network communication performance and cache performance. A control unit transforms asynchronous parallel steps in the shared-memory parallel program into synchronous parallel steps. Then, the control unit rearranges synchronous parallel steps of the operation to generate an altered shared-memory parallel program that schedules memory accesses for increasing locality of reference. Afterward, the control unit maps the altered shared-memory parallel program that schedules memory accesses for increasing locality of reference onto the distributed memory machine for improved communication efficiency. Then, the control unit executes the altered shared-memory parallel program on the distributed memory machine to simulate local memory accesses with virtual threads to check cache performance within each node of the distributed memory machine.

With reference now to FIG. 3, a diagram of a data processing system that includes a memory subsystem hierarchy is depicted in accordance with an illustrative embodiment. Data processing system 300 may, for example, be implemented in data processing system 200 in FIG. 2. Data processing system 300 is an example of single computer node within a distributed memory machine, such as network data processing system 100 in FIG. 1, in which a program that has been altered, modified, or optimized by an illustrative embodiment may be executed on. However, it should be noted that data processing system 300 is only intended as an example and is not meant as a restriction on illustrative embodiments.

Data processing system 300 includes processors 302, caches 304, and main memory 306. Processors 302 provide the data processing capabilities of data processing system 300. Processors 302 represent one or more processors. Processors 302 may, for example, be processor unit 204 in FIG. 2.

Caches 304 and main memory 306 represent a memory hierarchy within data processing system 300. Memory is divided up into a hierarchy in order to speed up data accesses. Hierarchical memory is a hardware optimization that takes advantage of reference locality. Caches 304 represent multiple levels of memory caches. For example, caches 304 include a level 1 (L1) cache, a level 2 (L2) cache, and a level 3 (L3) cache. However, it should be noted that caches 304 may include more or fewer caches in accordance with alternative illustrative embodiments.

Caches 304 are placed between processors 302 and main memory 306. However, it should be noted that one or more of caches 304 may be located within the architectures of processors 302. Caches 304 store recently referenced data and data related to the recently referenced data. A cache is a smaller portion of memory that is made of high-speed static random access memory (SRAM) instead of slower speed dynamic random access memory (DRAM) used for main memory, such as main memory 306. Main memory 306 may, for example, be memory 206 in FIG. 2.

Figure 4:
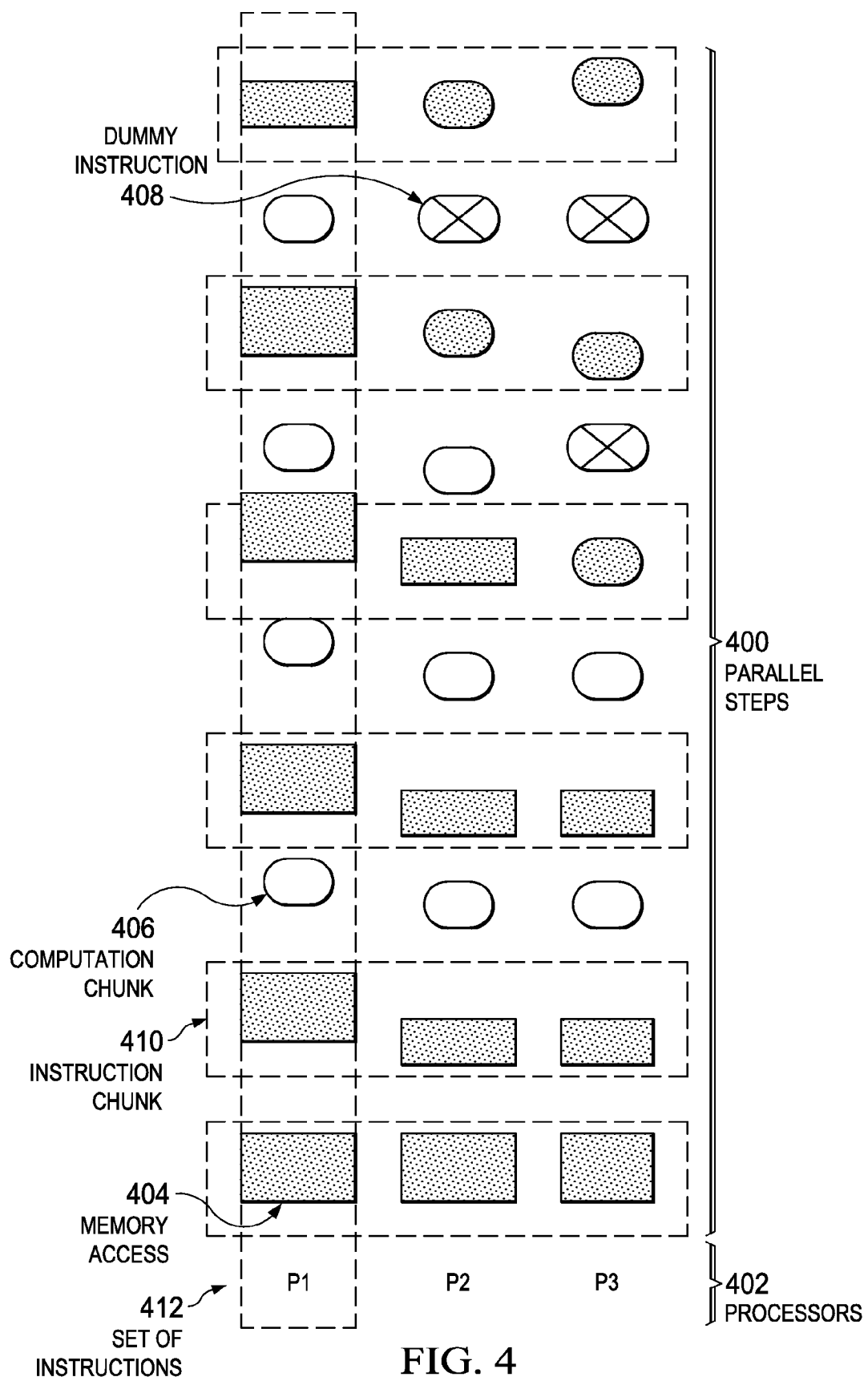
FIG. 4 is a diagram illustrating an example of transforming asynchronous parallel steps in a process into synchronous parallel steps in accordance with an illustrative embodiment.

With reference now to FIG. 4, a diagram illustrating an example of transforming asynchronous parallel steps in a process into synchronous parallel steps is depicted in accordance with an illustrative embodiment. Parallel steps 400 are a sequence of operations or instructions in a shared memory parallel program that are executed by a plurality of processors, such as processors 402. Processors 402 may, for example, be processors 302 in FIG. 3.

In this example, processors 402 includes processor 1 (P1), processor 2 (P2), and processor 3 (P3). However, it should be noted processors 402 may include more or fewer processors depending on different illustrative embodiments. Also, each of the processors in processors 402 have a different thread running on it.

A control unit, such as control unit 210 in FIG. 2, first transforms the asynchronous parallel steps in parallel steps 400 within the shared memory parallel program into synchronous parallel steps. The control unit inspects the sequence of steps performed by each processor and divides these steps into chunks of instructions such that each shared memory access by processors 402 is an instruction chunk by itself, such as instruction chunk 410. In addition, computations, such as computation chunk 406, are performed by processors 402 between memory accesses.

The control unit aligns the sequence of instructions from each thread and the alignment can be viewed as introducing artificial barriers between the instruction chunks. Some threads may have more instruction chunks than other threads. As a result, the threads without enough instruction chunks in the sequence of instructions will introduce dummy instructions, such as dummy instruction 408. Dummy instruction 408 may, for example, access a piece of shared data owned locally by a thread or issue a no operation (no-op) instruction. Consequently, each thread is performing a memory access or a computation in each step in parallel steps 400.

In this example, processors 402 execute the instructions in each column, such as set of instructions 412, from bottom to top. Also in this example, the cross-hatched blocks are memory accesses, such as memory access 404; the white blocks are computations, such as computation chunk 406; and the X-marked blocks are dummies, such as dummy instruction 408. Further, each dotted horizontal box depicts the alignment of parallel steps 400.

Thus, FIG. 4 illustrates an example of transforming asynchronous parallel steps in a process into synchronous parallel steps. After the transformation, the altered or modified process may be considered as an interleaving of memory accesses to shared instructions and computations. Memory accesses to shared instructions are synchronized by using, for example, a barrier between steps. One example of such a barrier may be a Unified Parallel C (UPC) barrier. Unified Parallel C is an extension of the C programming language designed for high-performance computing on large-scale parallel machines, including those with a common global address space and those with distributed memory.

With reference now to FIG. 5, a specific example of recursively scheduling memory accesses for increased locality of reference to increase cache performance is depicted in accordance with an illustrative embodiment. Recursive scheduling process 500 increases cache performance in a data processing system, such as data processing system 300 in FIG. 3, by recursively scheduling shared memory accesses to increase locality of reference. Recursive scheduling process 500 includes steps 502, 504, 506, and 508.

Illustrative embodiments further transform the process that was transformed in FIG. 4 so that the memory accesses are scheduled in a way for better locality of reference behavior. Irregular memory accesses may occur on each processor for some parallel operations after the transformation. Steps with regular memory accesses are straightforward and should perform well. However, the irregular memory accesses are usually in the form of indirect references that may be random.

Illustrative embodiments schedule these irregular memory accesses to resolve the random access pattern. Illustrative embodiments evenly divide a data array into blocks and group all memory access requests that fall in one block into a group. The reason for such a grouping of memory access requests is to enforce ordering onto the otherwise random memory accesses. By changing the size of the block, illustrative embodiments may control the degree of desired memory access ordering. If possible, the size of the block should be chosen to balance the cost of grouping memory access requests, which favors smaller size blocks, and the gain of more ordered memory access requests, which favors larger size blocks. In addition, the size of the block should be chosen such that the selected block size fits in a cache, when possible. It should be noted that on heterogeneous data processing systems, the data arrays may be divided unevenly.

Illustrative embodiments simulate each step in the process on virtual threads. Each virtual thread inspects the values of all its memory access requests, which are used as indices to access the data array. Then, each virtual thread groups these memory access requests according to which block each of these memory access requests falls to in the data array. The memory access requests from all the virtual threads to each respective block in the data array are then batched together. Then, each virtual thread reads all memory access requests for a particular block in the data array and deposits those particular requests into a contiguous global buffer. Next, each virtual thread retrieves data associated with memory access requests from blocks that are owned by a particular virtual thread. It should be noted that the data retrieval at each virtual thread may be recursively handled in a similar fashion.

At step 502 in recursive scheduling process 500, the data in an array is partitioned into blocks. At step 504, data access requests from virtual threads that correspond to a particular block in the array are grouped together. It should be noted that each different virtual thread is assigned a different block in the array. Also, each data access request is directed to the thread owning the block of data.

At step 506, each respective virtual thread accesses the appropriate data associated with the data access requests that correspond to the particular block owned by that thread. Each individual virtual thread recursively accesses its own data block by spawning more virtual threads. The data is then routed to the requesting thread. At step 508, after receiving the appropriate data, the requesting virtual thread permutes the data to match a memory access location in the array. In other words, the received data is put back into an order the virtual thread can use. The indices of the data received by a requesting thread are rearranged into the proper sequence for use by the thread.

Figure 6:
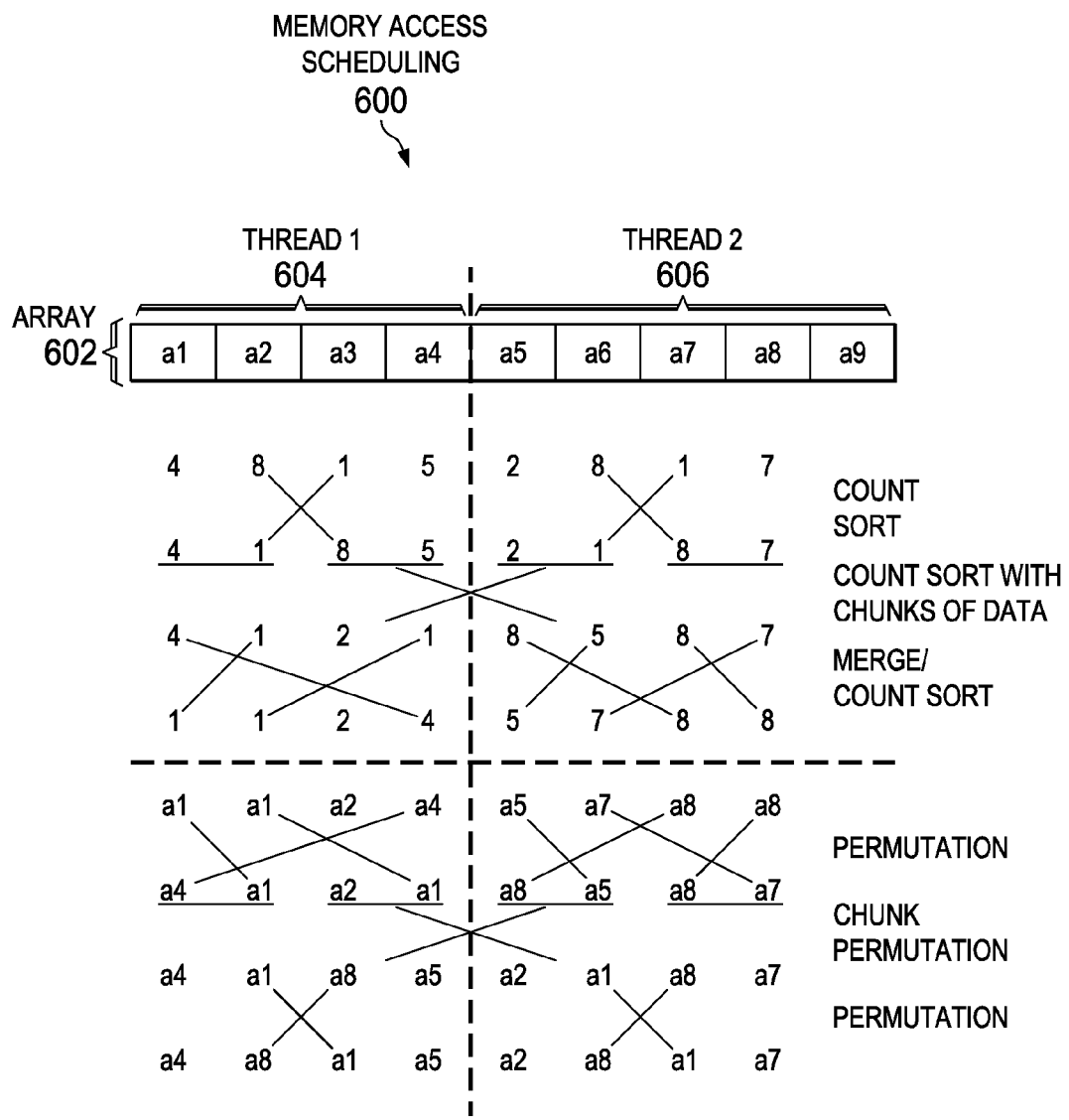
FIG. 6 is a specific example of scheduling memory accesses in accordance with an illustrative embodiment.

With reference now to FIG. 6, a specific example of scheduling memory accesses is depicted in accordance with an illustrative embodiment. Memory access scheduling 600 schedules shared memory accesses for a plurality of threads. Memory access scheduling 600 includes array 602, thread 1 604, and thread 2 606.

In this example, array 602 includes eight data elements, a1, a2, a3, a4, a5, a6, a7, and a8. In addition, array 602 is divided into two blocks. One block of array 602 is owned by thread 1 604 and the other block is owned by thread 2 606. Thread 1 604 and thread 2 606 are threads associated with the same process or program, such as a shared-memory parallel program.

Also in this example, thread 1 604 requires access to data elements with indices (4, 8, 1, 5) and thread 2 606 requires access to data elements with indices (2, 8, 1, 7). Instead of direct memory access that would be random, each of the threads groups its memory accesses according to which block in array 602 the requests fall into. Thus, thread 1 604 reorders its memory accesses into two data chunks: (4, 1) for chunk 1 and (8, 5) for chunk 2. Similarly, thread 2 606 reorders its memory accesses into two data chunks: (2, 1) for chunk 1 and (8, 7) for chunk 2.

The data chunks are then sorted according to their block identification, after which thread 1 604 is in charge of accessing data elements (4, 1) and (2, 1) and thread 2 606 is in charge of accessing data elements (8, 5) and (8, 7). Now, each thread will only access data elements that are within a particular contiguous region of array 602 instead accessing the whole range of array 602. For thread 1 604, the particular contiguous region is [1, 4]. For thread 2 606 the particular contiguous region is [5, 8].

Each thread now sorts the indices using merge sort or count sort to further impose ordering on the indices. Thread 1 604 now has indices (1, 1, 2, 4) and thread 2 606 now has indices (5, 7, 8, 8). All the work up to this point may be considered as a particular way of permuting the indices.

In fact, at this point the indices for each thread are sequential and thread 1 604 and thread 2 606 simply scan the particular contiguous region for their corresponding indicia values. Next, each thread permutes the read indicia values back to the correct memory locations by mirroring the sorting steps. It should be noted that operations above and below the horizontal dotted line mirror each other.

With reference now to FIG. 7, a specific example of mapping virtual shared memory accesses onto a distributed memory machine to increase network communication performance is depicted in accordance with an illustrative embodiment. Mapping process 700 maps a modified shared memory parallel program onto a distributed memory machine. Mapping process 700 includes steps 702, 704, 706, 708, 710, and 712.

At step 702, the indices of the data are sorted using the identification number of the target thread as a key. At step 704, the number of data elements to request from other threads is computed. At step 706, all threads are informed of the number of data elements and the target locations of the data elements are sent to the owning threads.

At step 708, all threads enter the barrier in order to synchronize all the threads. In this example, the barrier is a Unified Parallel C barrier. At step 710, the receiving threads inspect the memory access requests and transfer the requested data elements in batches. A receiving thread collects indices associated with the data elements requested by a requesting thread. Then, the receiving thread gathers the data elements and sends the gathered data elements to the requesting thread. At step 712, after receiving the requested data, the requesting thread permutes the received data to match a requested memory access location.

Figure 8:
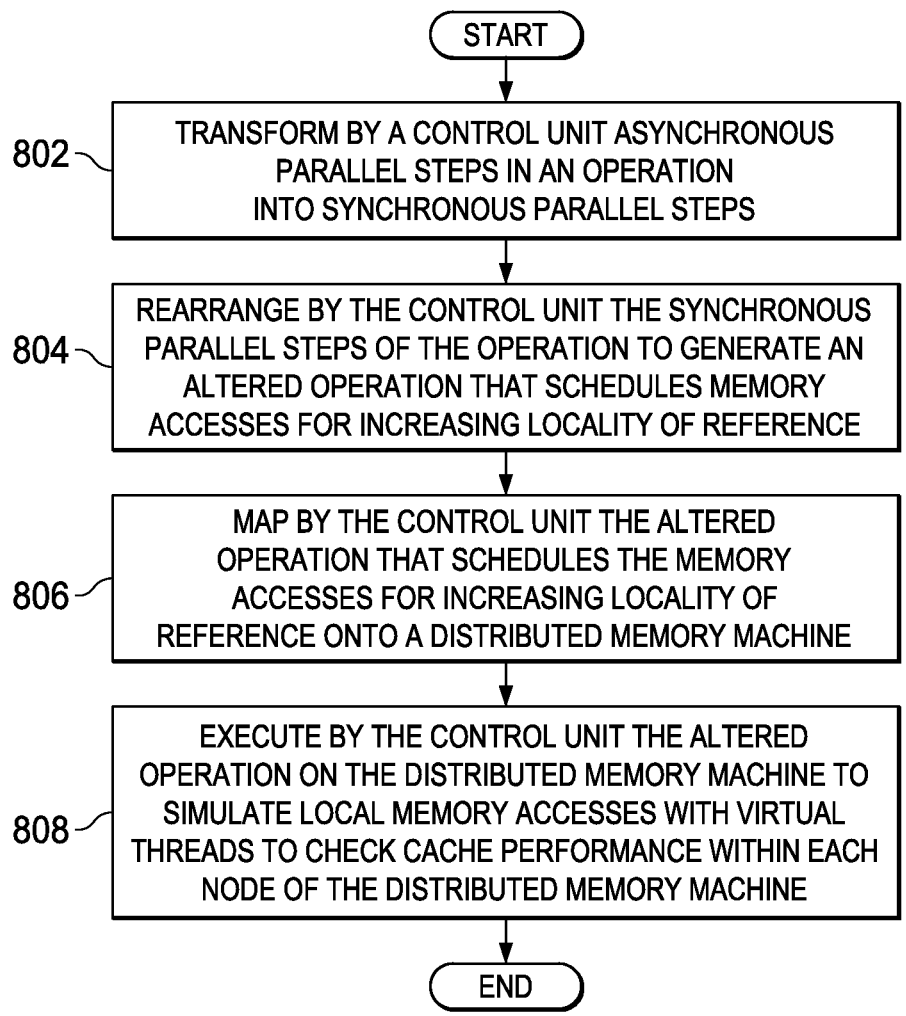
FIG. 8 is a flowchart illustrating a process for increasing parallel program performance for irregular memory access problems with virtual data partitioning and hierarchical collectives in accordance with an illustrative embodiment.

With reference now to FIG. 8, a flowchart illustrating a process for increasing parallel program performance for irregular memory access problems with virtual data partitioning and hierarchical collectives is shown in accordance with an illustrative embodiment. The process shown in FIG. 8 may be implemented in a control unit, such as control unit 210 in FIG. 2.

The process begins when the control unit transforms asynchronous parallel steps in an operation into synchronous parallel steps (step 802). The operation may, for example, be a computer program, such as a shared-memory parallel program. The parallel steps are a plurality of steps in the computer operation that may be concurrently executed by a plurality of different threads running on a plurality of different processors at the same time.

After transforming the asynchronous parallel steps in the operation into synchronous parallel steps in step 802, the control unit rearranges the synchronous parallel steps of the operation to generate an altered operation (step 804). The altered or modified computer operation schedules memory accesses for increasing locality of reference. Then, the control unit maps the altered operation that schedules the memory accesses for increasing the locality of reference onto a distributed memory machine, such as network data processing system 100 in FIG. 1 (step 806). Subsequently, the control unit executes the altered operation on the distributed memory machine to simulate local memory accesses with virtual threads to check cache performance within each node of the distributed memory machine (step 808). The process terminates thereafter.

Figure 9:
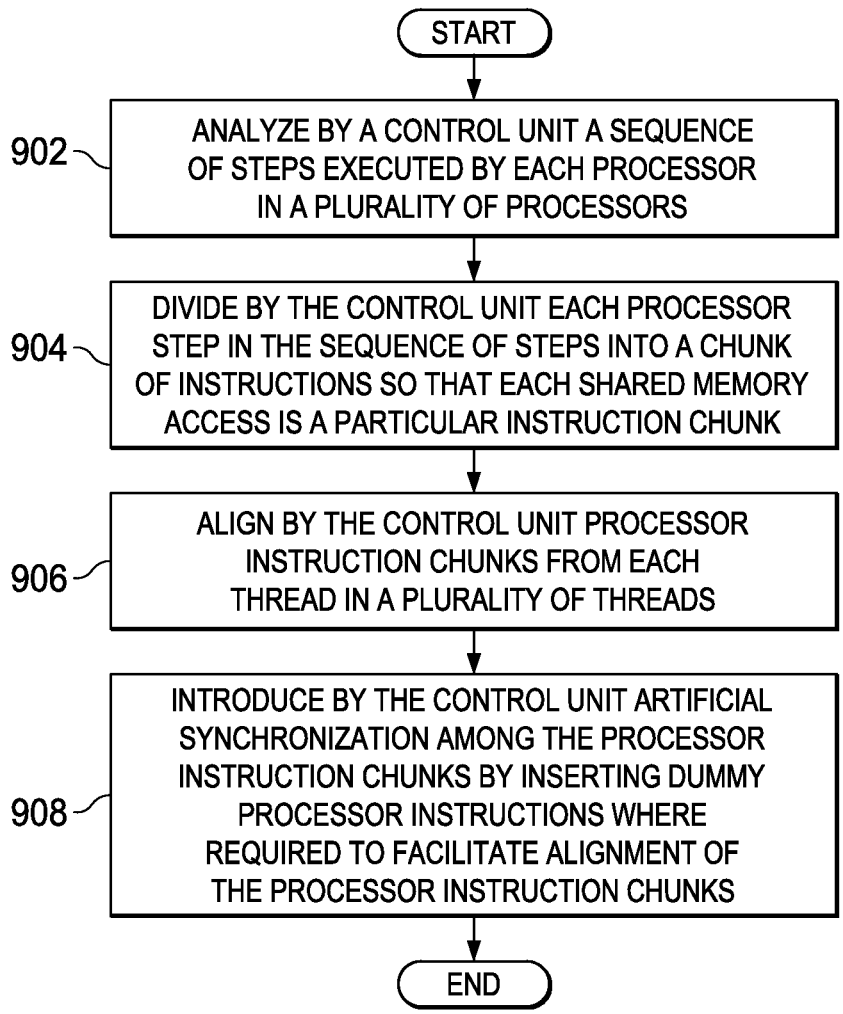
FIG. 9 is a flowchart illustrating a process for transforming asynchronous parallel steps in a process into synchronous parallel steps in accordance with an illustrative embodiment.

With reference now to FIG. 9, a flowchart illustrating a process for transforming asynchronous parallel steps in a process into synchronous parallel steps is shown in accordance with an illustrative embodiment. The process shown in FIG. 9 may be implemented in a control unit, such as control unit 210 in FIG. 2.

The process begins when the control unit analyzes a sequence of steps executed by each processor in a plurality of processors (step 902). For example, the control unit analyzes parallel steps 400 executed by each processor in processors 402 in FIG. 4. Then, the control unit divides each processor step in the sequence of steps into a chunk of instructions so that each shared memory access is a particular instruction chunk, such as instruction chunk 410 in FIG. 4 (step 904). A chunk of instructions is specific data required by one or more of the processors at a particular step in the sequence of steps.

After dividing each processor step in the sequence of steps into instruction chunks in step 904, the control unit aligns processor instruction chunks, such as set of instructions 412 in FIG. 4, from each thread in a plurality of threads (step 906).

In addition, the control unit introduces artificial synchronization among the processor instruction chunks by inserting dummy processor instructions, such as dummy instruction 408 in FIG. 4, where required to facilitate alignment of the processor instruction chunks (step 908). The process terminates thereafter.

Figure 10:
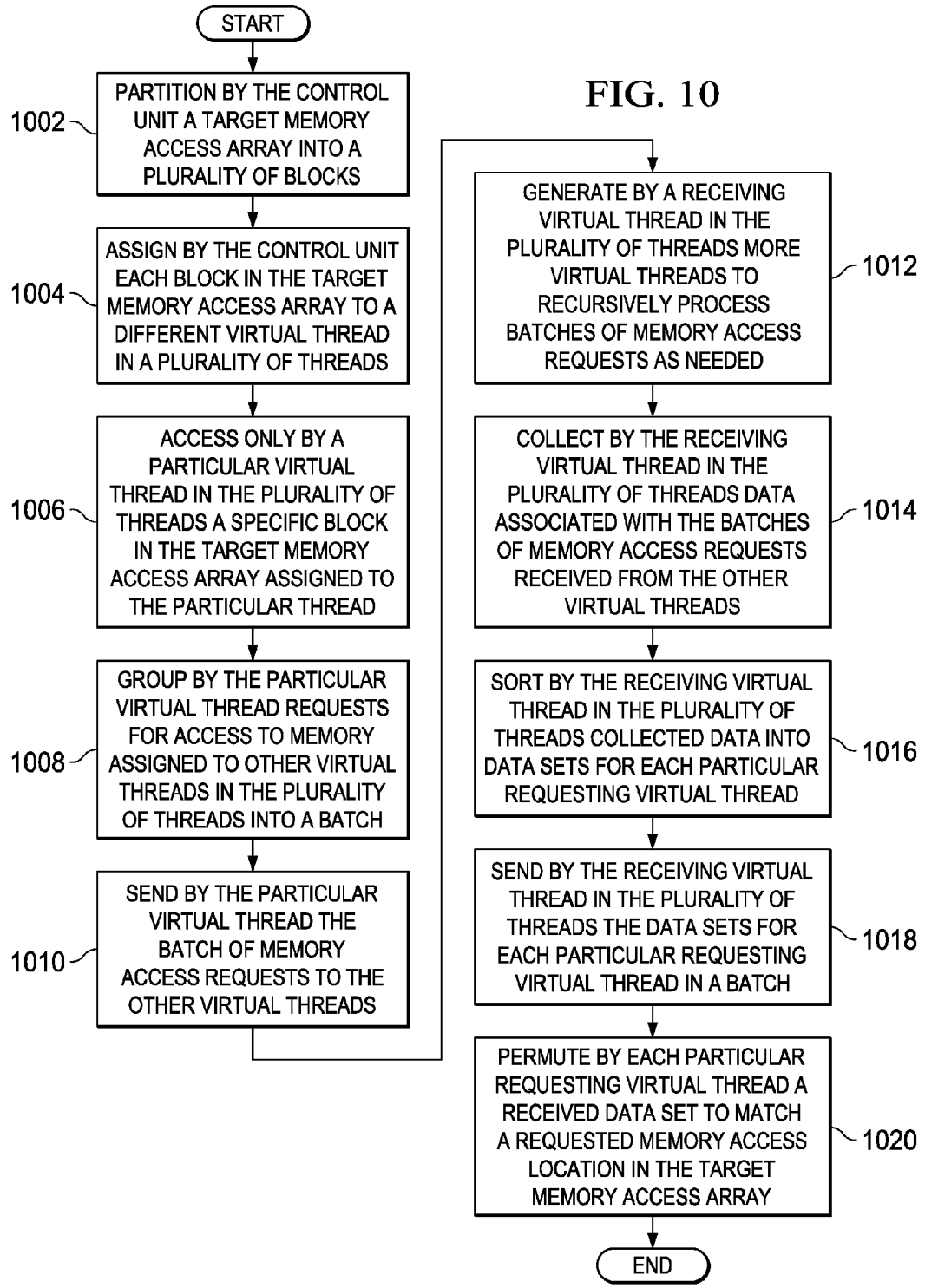
FIG. 10 is a flowchart illustrating a process for rearranging synchronous parallel steps of a process to generate an altered process in accordance with an illustrative embodiment.

With reference now to FIG. 10, a flowchart illustrating a process for rearranging synchronous parallel steps of a process to generate an altered process is shown in accordance with an illustrative embodiment. The process shown in FIG. 10 may be implemented in a control unit, such as control unit 210 in FIG. 2.

The process begins when the control unit partitions a target memory access array into a plurality of blocks (step 1002). Then, the control unit assigns each block in the target memory access array to a different virtual thread in a plurality of threads (step 1004). For example, the control unit assigns thread 1 604 and thread 2 606 in FIG. 6 to each block in the target memory access array. Subsequently, a particular virtual thread in the plurality of threads accesses only a specific block in the target memory access array assigned to that particular thread (step 1006).

In addition, the particular virtual thread groups requests for access to memory assigned to other virtual threads in the plurality of threads into a batch (step 1008). Grouping memory access requests into a batch increases network communication performance. Then, the particular virtual thread sends the batch of memory access requests to the other virtual threads (step 1010).

Afterward, a receiving virtual thread in the plurality of threads generates more virtual threads to recursively process batches of memory access requests as needed (step 1012). Then, the receiving virtual thread in the plurality of threads collects data associated with the batches of memory access requests received from the other virtual threads (step 1014). In addition, the receiving virtual thread in the plurality of threads sorts the collected data into data sets for each particular requesting virtual thread (step 1016).

Subsequently, the receiving virtual thread in the plurality of threads sends the data sets for each particular requesting virtual thread in a batch (step 1018). Afterward, each particular requesting virtual thread permutes a received data set to match a requested memory access location in the target memory access array (step 1020). Permute means to change or rearrange the sequence or order of the memory access locations of the received data set to match the memory access locations in the target memory access array. The process terminates thereafter.

Figure 11:
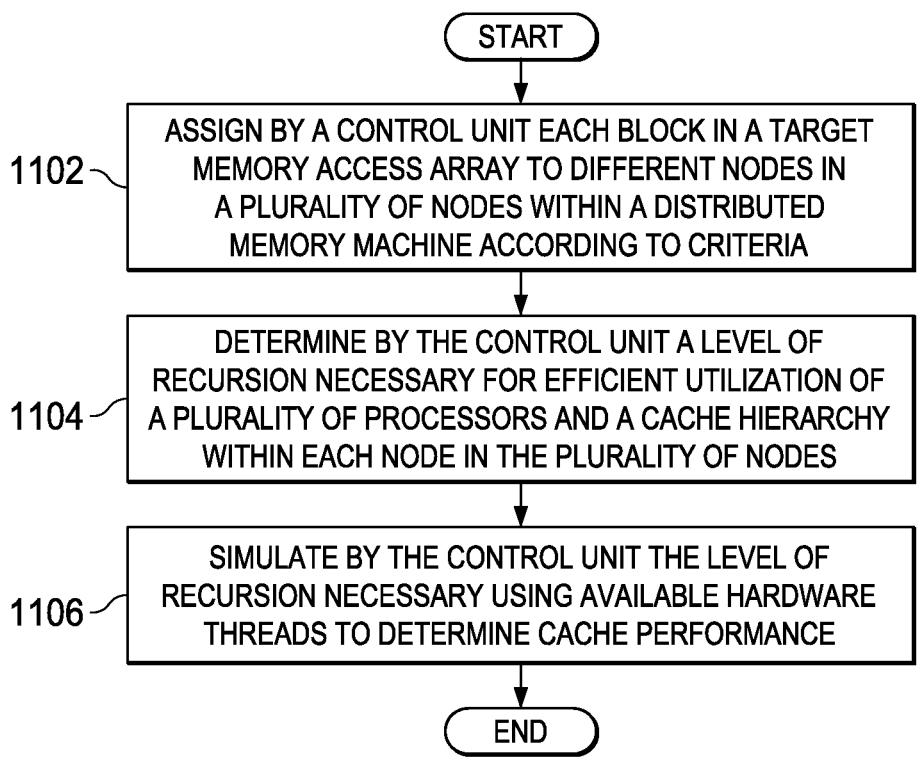
FIG. 11 is a flowchart illustrating a process for mapping an altered operation onto a distributed memory machine in accordance with an illustrative embodiment.

With reference now to FIG. 11, a flowchart illustrating a process for mapping an altered operation onto a distributed memory machine is shown in accordance with an illustrative embodiment. The process shown in FIG. 11 may be implemented in a control unit, such as control unit 210 in FIG. 2.

The process begins when the control unit assigns each block in a target memory access array to different nodes in a plurality of nodes within a distributed memory machine, such as network data processing system 100 in FIG. 1, according to criteria (step 1102). The criteria may, for example, be a block distribution or cyclic distribution criteria. After assigning each block in a target memory access array to different nodes in the distributed memory machine in step 1102, the control unit determines a level of recursion necessary for efficient utilization of a plurality of processors and a cache hierarchy, such as processors 302 and caches 304 in FIG. 3, within each node in the plurality of nodes (step 1104). Then, the control unit simulates the level of recursion necessary using available hardware threads to determine cache performance (step 1106). The process terminates thereafter.

Thus, illustrative embodiments of the present invention provide a computer implemented method, apparatus, and computer program product for increasing performance of a shared-memory parallel program on a distributed memory machine by increasing network communication performance and cache performance. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for increasing performance of an operation on a distributed memory machine, the computer implemented method comprising:
    transforming asynchronous parallel steps in the operation into synchronous parallel steps by analyzing a sequence of steps executed by each processor in a plurality of processors, dividing each processor step in the sequence of steps into a chunk of instructions so that each shared memory access is a particular instruction chunk, aligning processor instruction chunks from each thread in a plurality of threads, and introducing artificial synchronization among the processor instruction chunks by inserting dummy processor instructions where required to facilitate alignment of the processor instruction chunks;
    rearranging the synchronous parallel steps of the operation to generate an altered operation that schedules memory accesses for increasing locality of reference by partitioning a target memory access array into a plurality of blocks, and assigning each block in the target memory access array to a different virtual thread in a plurality of threads;
    mapping the altered operation that schedules memory accesses for increasing locality of reference onto the distributed memory machine; and executing the altered operation on the distributed memory machine to simulate local memory accesses with virtual threads to check cache performance within each node of the distributed memory machine.

2. The computer implemented method of claim 1 wherein rearranging the synchronous parallel steps of the operation to generate the altered operation further comprises:
  accessing only by a particular virtual thread in the plurality of threads a specific block in the target memory access array assigned to the particular thread;
  grouping by the particular virtual thread requests for access to memory assigned to other virtual threads in the plurality of threads into a batch; and
  sending by the particular virtual thread the batch of memory access requests to the other virtual threads.

3. The computer implemented method of claim 2 wherein rearranging the synchronous parallel steps of the operation to generate the altered operation further comprises:
  generating by a receiving virtual thread in the plurality of threads more virtual threads to recursively process batches of memory access requests as needed;
  collecting by the receiving virtual thread in the plurality of threads data associated with the batches of memory access requests received from the other virtual threads;
  sorting by the receiving virtual thread in the plurality of threads collected data into data sets for each particular requesting virtual thread; and
  sending by the receiving virtual thread in the plurality of threads the data sets for each particular requesting virtual thread in a batch.

4. The computer implemented method of claim 3 wherein rearranging the synchronous parallel steps of the operation to generate the altered operation further comprises:
  permuting by each particular requesting virtual thread a received data set to match a requested memory access location in the target memory access array.

5. The computer implemented method of claim 1 wherein mapping the altered operation onto the distributed memory machine further comprises:
  assigning each block in a target memory access array to different nodes in a plurality of nodes within a distributed memory machine according to criteria;
  determining a level of recursion necessary for efficient utilization of a plurality of processors and a cache hierarchy within each node in the plurality of nodes; and
  simulating the level of recursion necessary using available hardware threads to determine cache performance.

6. The computer implemented method of claim 5 wherein each block in the target memory access array is assigned to the different nodes in the plurality of nodes within the distributed memory machine using one of block distribution or cyclic distribution.

7. The computer implemented method of claim 1 wherein the operation is a shared-memory parallel program.

8. A data processing system for increasing performance of an operation on a distributed memory machine, the data processing system comprising:
  a bus system;
  a storage device connected to bus system, wherein the storage device stores a set of instructions; and
  a processing unit connected to the bus system, wherein the processing unit executes the set of instructions to transform asynchronous parallel steps in the operation into synchronous parallel steps by analyzing a sequence of steps executed by each processor in a plurality of processors, dividing each processor step in the sequence of steps into a chunk of instructions so that each shared memory access is a particular instruction chunk, aligning processor instruction chunks from each thread in a plurality of threads, and introducing artificial synchronization among the processor instruction chunks by inserting dummy processor instructions where required to facilitate alignment of the processor instruction chunks; rearrange the synchronous parallel steps of the operation to generate an altered operation that schedules memory accesses for increasing locality of reference by partitioning a target memory access array into a plurality of blocks, and assigning each block in the target memory access array to a different virtual thread in a plurality of threads; map the altered operation that schedules memory accesses for increasing locality of reference onto the distributed memory machine; and execute the altered operation on the distributed memory machine to simulate local memory accesses with virtual threads to check cache performance within each node of the distributed memory machine.

9. A computer program product stored in a memory having computer usable program code embodied thereon for increasing performance of an operation on a distributed memory machine, the computer program product comprising:
  computer usable program code configured to transform asynchronous parallel steps in the operation into synchronous parallel steps by analyzing a sequence of steps executed by each processor in a plurality of processors, dividing each processor step in the sequence of steps into a chunk of instructions so that each shared memory access is a particular instruction chunk, aligning processor instruction chunks from each thread in a plurality of threads, and introducing artificial synchronization among the processor instruction chunks by inserting dummy processor instructions where required to facilitate alignment of the processor instruction chunks;
  computer usable program code configured to rearrange the synchronous parallel steps of the operation to generate an altered operation that schedules memory accesses for increasing locality of reference by partitioning a target memory access array into a plurality of blocks, and assigning each block in the target memory access array to a different virtual thread in a plurality of threads;
  computer usable program code configured to map the altered operation that schedules memory accesses for increasing locality of reference onto the distributed memory machine; and
  computer usable program code configured to execute the altered operation on the distributed memory machine to simulate local memory accesses with virtual threads to check cache performance within each node of the distributed memory machine.

10. The computer program product of claim 9 wherein the computer usable program code configured to rearrange the synchronous parallel steps of the operation to generate the altered operation further comprises:
  computer usable program code configured to access only by a particular virtual thread in the plurality of threads a specific block in the target memory access array assigned to the particular thread;
  computer usable program code configured to group by the particular virtual thread requests for access to memory assigned to other virtual threads in the plurality of threads into a batch; and
  computer usable program code configured to send by the particular virtual thread the batch of memory access requests to the other virtual threads.

11. The computer program product of claim 10 wherein the computer usable program code configured to rearrange the synchronous parallel steps of the operation to generate the altered operation further comprises:
> computer usable program code configured to generate by a receiving virtual thread in the plurality of threads more virtual threads to recursively process batches of memory access requests as needed;
> computer usable program code configured to collect by the receiving virtual thread in the plurality of threads data associated with the batches of memory access requests received from the other virtual threads;
> computer usable program code configured to sort by the receiving virtual thread in the plurality of threads collected data into data sets for each particular requesting virtual thread; and
> computer usable program code configured to send by the receiving virtual thread in the plurality of threads the data sets for each particular requesting virtual thread in a batch.

12. The computer program product of claim 11 wherein the computer usable program code configured to rearrange the synchronous parallel steps of the operation to generate the altered operation further comprises:
> computer usable program code configured to permute by each particular requesting virtual thread a received data set to match a requested memory access location in the target memory access array.

13. The computer program product of claim 9 wherein the computer usable program code configured to map the altered operation onto the distributed memory machine further comprises:
> computer usable program code configured to assign each block in a target memory access array to different nodes in a plurality of nodes within a distributed memory machine according to criteria;
> computer usable program code configured to determine a level of recursion necessary for efficient utilization of a plurality of processors and a cache hierarchy within each node in the plurality of nodes; and
> computer usable program code configured to simulate the level of recursion necessary using available hardware threads to determine cache performance.

14. The computer program product of claim 13 wherein each block in the target memory access array is assigned to the different nodes in the plurality of nodes within the distributed memory machine using one of block distribution or cyclic distribution.

15. The computer program product of claim 9 wherein the operation is a shared-memory parallel program.

* * * * *